United States Patent
Joo et al.

(12) 
(10) Patent No.: US 10,697,340 B1
(45) Date of Patent: Jun. 30, 2020

(54) AFTER TREATMENT SYSTEM AND AFTER TREATMENT METHOD FOR LEAN-BURN ENGINE

(71) Applicants: Hyundai Motor Company, Seoul (KR); KIA Motors Corporation, Seoul (KR)

(72) Inventors: Nahm Roh Joo, Gyeonggi-do (KR); Chang Hwan Kim, Gyeonggi-do (KR); ChangHo Jung, Gyeonggi-do (KR); Chulho Yu, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 31 days.

(21) Appl. No.: 16/263,593

(22) Filed: Jan. 31, 2019

(51) Int. Cl.
*F01N 3/10* (2006.01)
*F01N 3/20* (2006.01)
*B01D 53/94* (2006.01)

(52) U.S. Cl.
CPC .......... *F01N 3/2073* (2013.01); *F01N 3/101* (2013.01); *F01N 3/103* (2013.01); *F01N 3/208* (2013.01); *F01N 3/2066* (2013.01); *B01D 53/945* (2013.01); *B01D 53/9477* (2013.01); *B01D 53/9481* (2013.01); *B01D 53/9495* (2013.01); *B01D 2255/40* (2013.01); *B01D 2255/904* (2013.01); *B01D 2255/908* (2013.01); *B01D 2255/911* (2013.01); *B01D 2258/012* (2013.01); *F01N 2610/02* (2013.01); *F01N 2900/1404* (2013.01); *F01N 2900/1622* (2013.01); *F01N 2900/1624* (2013.01)

(58) Field of Classification Search
CPC ........ F01N 3/101; F01N 3/103; F01N 3/2066; F01N 3/2073; F01N 3/208; F01N 2610/02; F01N 2900/1622; F01N 2900/1624
See application file for complete search history.

(56) References Cited

U.S. PATENT DOCUMENTS

| | | | |
|---|---|---|---|
| 2010/0043402 A1 | 2/2010 | Perry et al. | |
| 2010/0139248 A1 | 6/2010 | Najt et al. | |
| 2010/0212295 A1 | 8/2010 | Narayanaswamy et al. | |
| 2010/0326052 A1 | 12/2010 | Sun | |
| 2011/0202253 A1 | 8/2011 | Perry et al. | |
| 2011/0288750 A1 | 11/2011 | Wermuth et al. | |
| 2012/0060472 A1 | 3/2012 | Li et al. | |
| 2015/0174529 A1* | 6/2015 | Irisawa | B01D 53/9431 422/114 |

* cited by examiner

*Primary Examiner* — Audrey K Bradley
(74) *Attorney, Agent, or Firm* — Brinks Gilson & Lione (57) ABSTRACT

An after treatment method for a lean-burn engine is disclosed.
The after treatment method is configured to control an after treatment system sequentially equipped with an ammonia production catalyst module, a selective catalytic reduction catalyst, and a CO clean-up catalyst on an exhaust pipe through which an exhaust gas flows. In the after treatment method, the engine is operated sequentially at a stoichiometric air/fuel ratio (AFR) and a lean AFR prior to entering a rich AFR.

17 Claims, 9 Drawing Sheets

AFTER TREATMENT SYSTEM AND AFTER TREATMENT METHOD FOR LEAN-BURN ENGINE

FIELD

The present disclosure relates to an after treatment system and an after treatment method for a lean-burn engine.

BACKGROUND

The statements in this section merely provide background information related to the present disclosure and may not constitute prior art.

Vehicles may be provided with at least one catalytic converter for reducing emission (EM) contained in an exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

A lean-burn engine among gasoline engines improves fuel efficiency by burning a lean air/fuel mixture. The lean-burn engine burns the lean air/fuel mixture, so air/fuel ratio (AFR) of the exhaust gas is also lean. However, when the AFR is lean, the TWC slips the NOx without sufficiently reducing all of the NOx contained in the exhaust gas. Accordingly, a vehicle equipped with the lean-burn engine may include a selective catalytic reduction (SCR) catalyst for purifying the NOx slipped from the TWC. The SCR catalyst used in the vehicle equipped with the lean-burn engine may be a passive type SCR catalyst.

When the AFR is rich, the TWC may reduce the NOx to produce NH3 and the NH3 generated in the TWC is stored in the passive type SCR catalyst. When the AFR is lean, the passive type SCR catalyst purifies the NOx contained in the exhaust gas using the stored $NH_3$.

The lean-burn engine equipped with the TWC and the passive type SCR catalyst may adjust the AFR to be rich by increasing fuel for a predetermined duration in order to store a sufficient amount of the $NH_3$ in the passive type SCR catalyst. If the amount of the NOx discharged from the lean-burn engine increases, the number and duration where the lean-burn engine operates at the rich AFR also increase. Therefore, fuel economy may be deteriorated.

To decrease deterioration of fuel economy, the amount of the $NH_3$ generated at the rich AFR must be increased. In this case, the duration for which the rich AFR is maintained can be reduced, thereby suppressing deterioration of fuel economy. An ammonia production catalyst (APC) may be added to a downstream of the TWC to increase the amount of the $NH_3$ produced at the rich AFR. The APC can store the NOx contained in the exhaust gas at the lean AFR and produce the $NH_3$ using the stored NOx and the NOX contained in the exhaust gas at the rich AFR. Therefore, the APC can produce more $NH_3$ than the TWC does at the rich AFR.

However, since the APC contains components capable of storing the NOx, if the engine is operated at the rich AFR in a state that a temperature of the APC is low, nitrous oxide ($N_2O$) may be generated in the APC. Therefore, if the temperature of the APC is low when conversion to the rich AFR is desired or required, we have discovered that the APC should be heated to a predetermined temperature.

In addition, we have discovered that the CO and the HC may be slipped from the TWC at the rich AFR. The CO and the HC slipped from the TWC may not be purified but be exhausted to an exterior of the vehicle. Therefore, an additional catalytic converter or control for reducing the CO and the HC slipped when the AFR is rich in order to produce $NH_3$ may be desired.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an after treatment system for a lean-burn engine having advantages of capable of reducing an amount of carbon monoxide discharged to an exterior of a vehicle while increasing ammonia production at a rich AFR.

Another aspect of the present disclosure provides an after treatment method for a lean-burn engine having further advantages of capable of reducing nitrous oxide and carbon monoxide which can be discharged to the exterior of the vehicle by efficiently heating an ammonia production catalyst when conversion to the rich AFR is desired or required.

An after treatment system for a lean-burn engine according to an aspect of the present disclosure may include: an exhaust pipe connected to the lean-burn engine and through which an exhaust gas generated in the lean-burn engine flows; a three-way catalyst (TWC) mounted on the exhaust pipe and purifying hydrocarbon (HC), carbon monoxide (CO), and nitrogen oxide (NOx) contained in the exhaust gas; an ammonia production catalyst (APC) mounted on the exhaust pipe downstream of the TWC, storing NOx at a lean air/fuel ratio (AFR), and generating $H_2$, releasing the stored NOx, and generating ammonia ($NH_3$) using the released NOx and the generated $H_2$ at a rich AFR; a selective catalytic reduction (SCR) catalyst mounted on the exhaust pipe downstream of the APC, storing the $NH_3$ generated in the APC, and reducing the NOx contained in the exhaust gas using the stored $NH_3$; a CO clean-up catalyst (CUC) mounted on the exhaust pipe downstream of the SCR catalyst and purifying the CO contained in the exhaust gas; and a controller detecting information on the AFR and temperature of the exhaust gas and controlling the AFR of the exhaust gas based on the information on the AFR and the temperature of the exhaust gas, wherein the controller compares a temperature of the APC with a threshold temperature in response to detecting conversion to the rich AFR is desired, and operating the engine at a stoichiometric AFR before converting in the rich AFR when the temperature of the APC is lower than the threshold temperature.

The controller may operate the engine at the stoichiometric AFR for a first predetermined duration.

The first predetermined duration may be determined according to the temperature of the APC at a detecting time when the conversion to the rich AFR is necessary or desired.

The controller may operate the engine at a target lean AFR for a second predetermined duration before converting to the rich AFR after operating the engine at the stoichiometric AFR.

The second predetermined duration may be determined according to the first predetermined duration, the target lean AFR and a temperature of the CUC.

The controller may operate the engine at a target rich AFR for a rich duration after operating the engine at the target lean AFR for the second predetermined duration.

The rich duration may be determined according to the target rich AFR and the temperature of the CUC.

The rich duration may be calculated such that a slip amount of the CO accumulated at a downstream of the CUC for the rich duration is smaller than or equal to a predetermined value if the engine is operated at the target rich AFR for the rich duration.

The after treatment system may further include a particulate filter disposed between the TWC and the APC or between the APC and the SCR catalyst, wherein the particulate filter traps particulate matter in the exhaust gas.

An after treatment method according to another aspect of the present disclosure is configured to control an after treatment system sequentially equipped with a three-way catalyst (TWC), an ammonia production catalyst (APC), a selective catalytic reduction (SCR) catalyst, and a CO clean-up catalyst (CUC) on an exhaust pipe through which an exhaust gas flows and which is connected to a lean-burn engine.

The after treatment method may include: operating the engine at a lean AFR; calculating an amount of $NH_3$ stored in the SCR catalyst; determining whether conversion to a rich AFR is necessary or desired; determining, when the conversion to the rich AFR is necessary or desired, whether a temperature of the APC is higher than or equal to a threshold temperature; operating, when the temperature of the APC is lower than the threshold temperature, the engine at a stoichiometric AFR for a first predetermined duration; and operating the engine at a target rich AFR for a rich duration.

The first predetermined duration may be determined according to the temperature of the APC at a determining time when the conversion to the rich AFR is desired.

The rich duration may be determined according to the target rich AFR and a temperature of the CUC.

The rich duration may be calculated such that a slip amount of the CO accumulated downstream of the CUC for the rich duration is smaller than or equal to a predetermined value if the engine is operated at the target rich AFR for the rich duration.

The after treatment method may further include operating the engine at a target lean AFR for a second predetermined duration before operating the engine at the rich AFR for the rich duration after operating the engine at the stoichiometric AFR for the first predetermined duration.

The second predetermined duration may be determined according to the first predetermined duration, the target lean AFR and a temperature of the CUC.

In one aspect, the determining whether conversion to a rich AFR is desired may include calculating an amount of NOx which will flow into the SCR catalyst, wherein the conversion to the rich AFR is determined to be desired when the amount of the $NH_3$ stored in the SCR catalyst is smaller than an amount of the $NH_3$ required to purify the amount of the NOx which will flow into the SCR catalyst.

In another aspect, the determining whether conversion to a rich AFR is desired may include comparing the amount of the $NH_3$ stored in the SCR catalyst with a predetermined $NH_3$ lower threshold, wherein the conversion to the rich AFR is determined to be desired when the amount of the $NH_3$ stored in the SCR catalyst is smaller than the predetermined $NH_3$ lower threshold.

According to aspects of the present disclosure, the APC can be disposed between the TWC and the SCR catalyst to increase the amount of the $NH_3$ supplied to the SCR catalyst at the rich AFR. Thus, the duration and the number of times where the engine operates at the rich AFR can be reduced, thereby improving fuel economy.

In addition, the CUC can be disposed at the downstream of the SCR catalyst to purify the CO slipped from the TWC and the APC.

In addition, the APC can be heated by operating the engine at the stoichiometric AFR prior to conversion to the rich AFR. Therefore, generation of nitrous oxide at the rich AFR can be reduced.

In addition, if the engine is operated at the stoichiometric AFR, the engine is operated again at the lean AFR to obtain oxygen storage capacity (OSC) of the CUC and then is operated at the rich AFR. Therefore, degradation of CO purification performance may be inhibited or prevented.

In addition, other effects of the aspects of the present disclosure should be directly or implicitly described in the description provided herein. Various effects predicted according to the aspects of the present disclosure will be disclosed in the description provided herein.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular aspects only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, aspects of the present disclosure will be described in detail with reference to the accompanying drawings.

Figure 1:
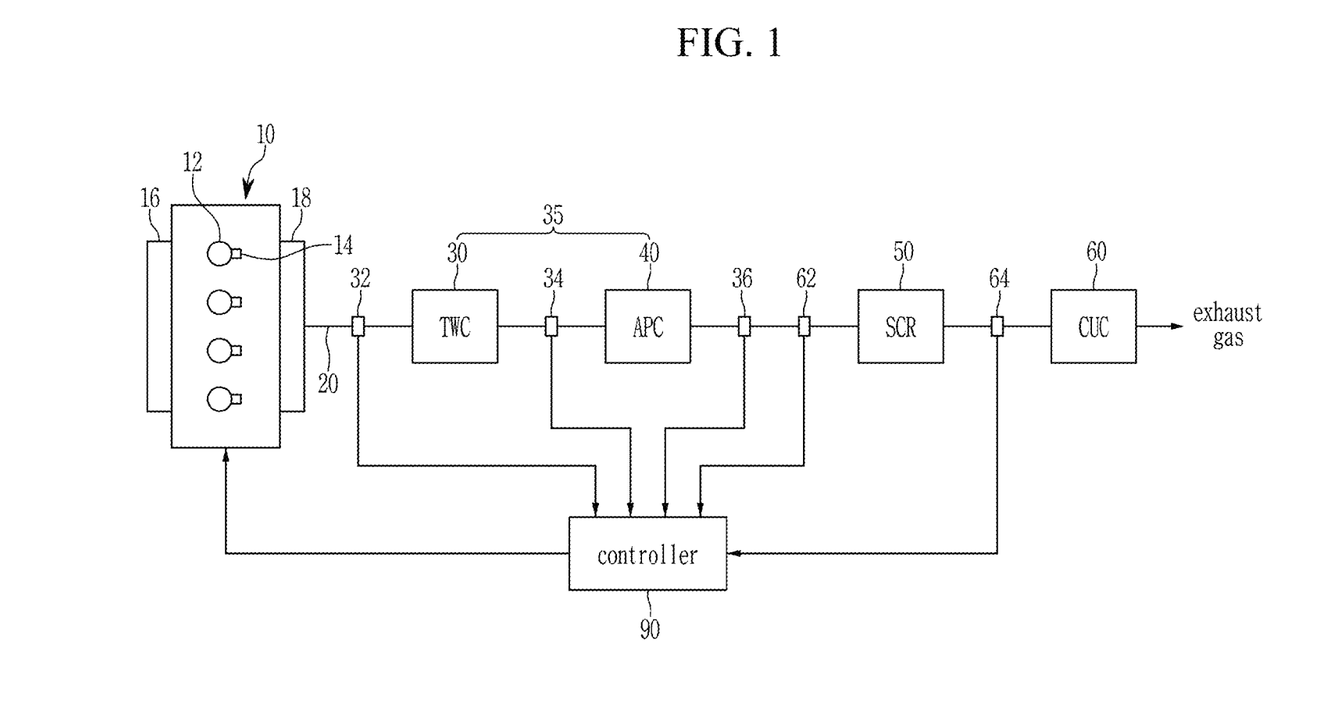
FIG. 1 is a schematic diagram of an after treatment system for a lean-burn engine according to an aspect of the present disclosure.

FIG. 1 is a schematic diagram of an after treatment system for a lean-burn engine according to an aspect of the present disclosure.

As shown in FIG. 1 an after treatment system according to an aspect of the present disclosure includes an engine 10, an exhaust pipe 20, an ammonia production catalyst module 35, a selective catalytic reduction (SCR) catalyst 50, and a CO clean-up catalyst (CUC) 60.

The engine 10 burns an air/fuel mixture to convert chemical energy into mechanical energy. The engine 10 is connected to an intake manifold 16 to flow air into a combustion chamber 12. An exhaust gas generated in combustion process is collected in an exhaust manifold 18 and then flows out from the engine 10. The combustion chamber 12 is equipped with a spark plug 14 to ignite the air/fuel mixture within the combustion chamber 12. The engine 10 may be a gasoline engine. Depending on types of gasoline engines, fuel may be directly injected into the combustion chamber 12 or the air/fuel mixture may be supplied to the combustion chamber 12 via the intake manifold 16. In addition, the engine 10 may be a lean-burn engine. Therefore, the engine 10 operates at a lean air/fuel ratio (AFR) except for special driving conditions.

The exhaust pipe 20 is connected to the exhaust manifold 18 to discharge the exhaust gas to an outside of the vehicle. The exhaust pipe 20 is equipped with the ammonia production catalyst module 35, the SCR catalyst 50, and the CUC 60 to purify or remove emission contained in the exhaust gas.

The ammonia production catalyst module 35 includes a three-way catalyst (TWC) 30 and an ammonia production catalyst (APC) 40. The TWC 30 and the APC 40 may be disposed in one housing but are not limited thereto. The ammonia production catalyst module 35 can generate $NH_3$ using NOx contained in the exhaust gas or stored in the ammonia production catalyst module 35 at a rich AFR. The ammonia production catalyst module 35 contains an oxygen storage material having oxygen storage capacity (OSC).

The TWC 30 is disposed on the exhaust pipe 20 through which the exhaust gas discharged from the engine 10 flows, and harmful materials including CO, HC, and NOx contained in the exhaust gas are converted into harmless components by an oxidation-reaction reaction in the TWC 30. Particularly, the TWC 30 can reduce the NOx contained in the exhaust gas into $NH_3$ at the rich AFR. At this time, the TWC 30 may not purify the CO and the HC in the exhaust gas sufficiently and may slip the CO and the HC therefrom. In addition, the TWC 30 oxidizes the CO and the HC contained in the exhaust gas at the lean AFR. Since the TWC 30 is well known to a person of an ordinary skill in the art, a detailed description thereof will be omitted.

The APC 40 is disposed on the exhaust pipe 20 at a downstream of the TWC 30. The APC 40 stores the NOx contained in the exhaust gas at the lean AFR, and generates $H_2$ to release the stored NOx and generates $NH_3$ using the released NOx and the generated $H_2$ at the rich AFR.

In one aspect, the APC 40 includes 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC 40.

In another aspect, the APC 40 includes 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of the composite of MgO and $Al_2O_3$, and 0-10 wt % of the additive based on the total weight of the APC.

The additive is added for the performance improvement of $CeO_2$ and $Al_2O_3$ and includes at least one of La, Zr, Mg and Pr.

The Pt contained in the APC 40 functions to oxidize the NOx for the APC 40 to store the NOx. In addition, the Pt increases an amount of $H_2$ generated in the APC 40.

The Pd contained in the APC 40 improves heat resistance of the APC 40. Since the APC 40 is disposed close to the engine 10, a temperature of the APC 40 can rise to 950° C. Therefore, the Pd is added in the APC 40 to improve heat resistance.

In order to increase the $NH_3$ generation and the $H_2$ generation, a weight ratio of the Pt to the Pd in the APC 40 may be 3:1-7:1. The weight ratio of the Pt to the Pd in the APC 40 may be 3:1-5:1.

The Rh contained in the APC 40 purifies the NOx contained in the exhaust gas at a stoichiometric AFR.

The Ba and the $CeO_2$ contained in the APC 40 is configured to store the NOx in nitrate form. The $CeO_2$ contains the oxygen storage material.

In addition, the $CeO_2$ increases $H_2$ generation. However, if the APC 40 contains large amounts of the $CeO_2$, the generated $NH_3$ can be reoxidized. Thus, the APC 40 may include 10-30 wt % of $CeO_2$ based on a total weight of the APC 40.

The composite of MgO and $Al_2O_3$ contained in the APC 40 functions as a substrate. The composite of MgO and $Al_2O_3$ may include 15-25 wt % of MgO based on a total weight of the composite of MgO and $Al_2O_3$. The MgO enhances thermal stability of the Ba.

The SCR catalyst 50 is mounted on the exhaust pipe 20 at a downstream of the APC 40. The SCR catalyst 50 stores the $NH_3$ generated in the ammonia production catalyst module 35 (i.e., the TWC 30 and the APC 40) at the rich AFR and reduces the NOx contained in the exhaust gas using the stored $NH_3$ at the lean AFR. This type of the SCR catalyst 50 may be referred to as a passive type SCR catalyst 50.

The SCR catalyst 50 may be composed of one or a combination of a zeolite catalyst and a metal catalyst supported in a porous $Al_2O_3$. At least one of Cu, Pt, Mn, Fe, Co, Ni, Zn, Cs and Ga may be ion-exchanged in the zeolite catalyst. In the metal catalyst supported in the porous $Al_2O_3$, at least one metal among Pt, Pd, Rh, Ir, Ru, W, Cr, Mn, Fe, Co, Cu, Zn and Ag may be supported in the porous $Al_2O_3$.

The CUC 60 is mounted on the exhaust pipe 20 at a downstream of the SCR catalyst 50. The CUC 60 purifies the CO contained in the exhaust gas. Particularly, the CO may be slipped from the ammonia production catalyst module 35 (i.e., the TWC 30 and the APC 40) at the rich AFR. Therefore, emission of the CO to the outside of the vehicle can be inhibited or prevented by disposing the CUC 60 at the most downstream of the after treatment system. The CUC 60 includes Pt, Pd, Rh, and Ba supported in $CeO_2$ and $Al_2O_3$.

In one aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-10 wt % of an additive based on a total weight of the CUC 60.

In another aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-20 wt % of an additive based on a total weight of the CUC 60.

The additive is added for improving performance of the $CeO_2$ and the $Al_2O_3$ and includes at least one of La, Zr, Mg and Pr.

The CUC 60 is mainly composed of Pt—CeO2. Here, the Pt functions to oxidize the CO, and the $CeO_2$ contains an oxygen storage material having oxygen storage capacity (OSC) to help oxidation of the CO at low temperature at the lean AFR. Pd/$Al_2O_3$ also plays a role similar to the Pt/CeO2, but an amount of the Pt/$CeO_2$ may be greater than that of the Pd/$Al_2O_3$ in order to improve oxidation ability at the low temperature.

The Ba contained in the CUC 60 functions to remove a small amount of the NOx that is not removed from the SCR catalyst 50 when the AFR is rich.

The Rh included in the CUC 60 is intended to promote reduction of the NOx when the AFR is rich.

The exhaust pipe 20 may be equipped with a plurality of sensors 32, 34, 36, 62, and 64 for detecting the AFR of the exhaust gas and operation of the catalysts 30, 40, 50 and 60.

A first oxygen sensor 32 is mounted on the exhaust pipe 20 at an upstream of the TWC 30, detects $O_2$ concentration in the exhaust gas at the upstream of the TWC 30, and transmits a signal corresponding thereto to a controller 90. The AFR (it will hereinafter be referred to as 'λ') of the exhaust gas described herein may refer to a value detected by the first oxygen sensor 32. In addition, an AFR control described here may refer to controlling the AFR of the exhaust gas to be a target AFR.

A second oxygen sensor 34 is mounted on the exhaust pipe 20 at the downstream of the TWC 30, detects $O_2$ concentration in the exhaust gas at the downstream of the TWC 30, and transmits a signal corresponding thereto to the controller 90.

A third oxygen sensor 36 is mounted on the exhaust pipe 20 at the downstream of the APC 40, detects $O_2$ concentration in the exhaust gas at the downstream of the APC 40 (i.e., the ammonia production catalyst module 35), and transmits a signal corresponding thereto to the controller 90. A value detected by the third oxygen sensor 36 is used to determine whether the OSC of the ammonia production catalyst module 35 is completely consumed.

A first temperature sensor 62 is mounted on the exhaust pipe 20 at an upstream of the SCR catalyst 50, detects a temperature of the exhaust gas at the upstream of the SCR catalyst 50, and transmits a signal corresponding thereto to the controller 90.

A second temperature sensor 64 is mounted on the exhaust pipe 20 at the downstream of the SCR catalyst 50, detects the temperature of the exhaust gas at the downstream of the SCR catalyst 50, and transmits a signal corresponding thereto to the controller 90.

Figure 4:
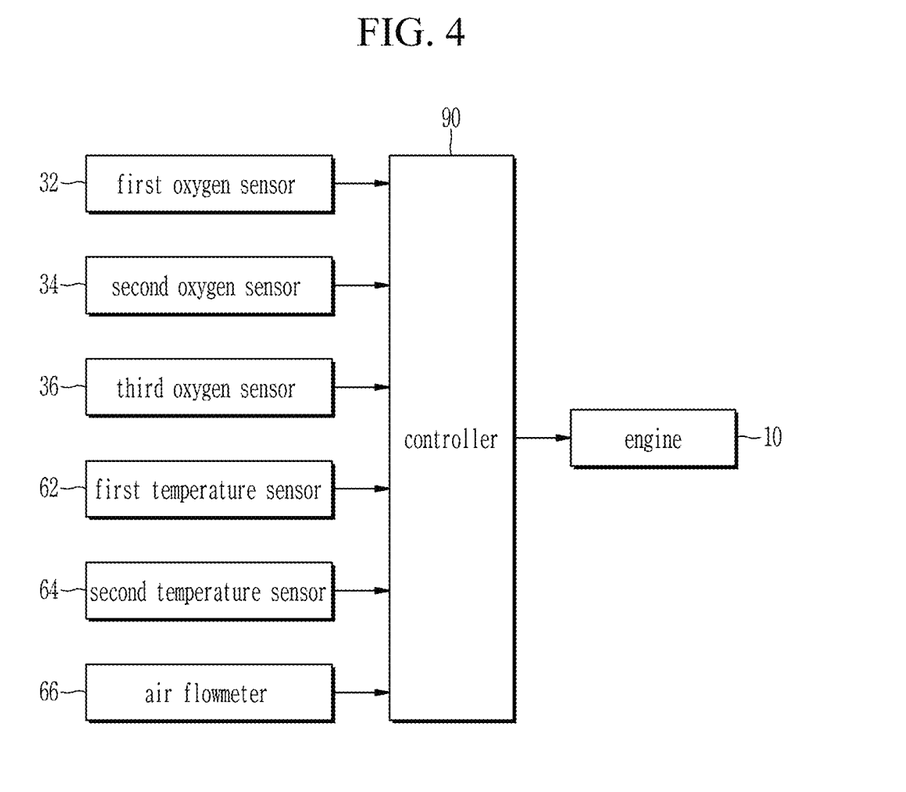
FIG. 4 is a block diagram of an after treatment system for a lean-burn engine according to an aspect of the present disclosure.

In addition to the sensors 32, 34, 36, 62, and 64 described herein, the after treatment system may further include various sensors. For example, additional temperature sensors can be mounted on the exhaust pipe 20 at the upstream and the downstream of the TWC 30 to detect the temperature of the exhaust gas at the upstream and the downstream of the TWC 30, respectively. In addition, as shown in FIG. 4, the after treatment system may further include an air flowmeter 66. Further, the after treatment system may further include a NOx sensor, an HC sensor or a CO sensor mounted on the exhaust pipe 20, and concentration of emission contained in the exhaust gas can be detected via these sensors.

The controller 90 is electrically connected to the sensors 32, 34, 36, 62, 64 and 66 to receive the signals corresponding to the detected values by the sensors 32, 34, 36, 62, 64 and 66, and determines driving condition of the vehicle, the AFR, and the temperatures of the catalysts 30, 40, 50, and 60 based on the signals. The controller 90 can control ignition timing, fuel injection timing, fuel amount, etc., by controlling the engine 10 based on the determination results. The controller 90 may be implemented with at least one processor executed by a predetermined program and the predetermined program may be programmed to perform each step of an after treatment method according to an aspect of the present disclosure.

Figure 2:
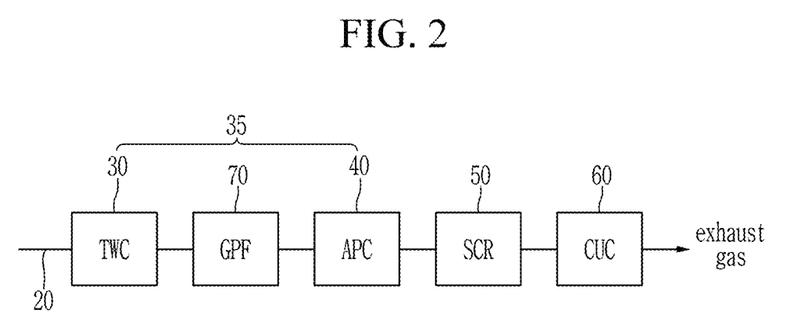
FIG. 2 is a schematic diagram of an after treatment system for a lean-burn engine according to another aspect of the present disclosure.

FIG. 2 is a schematic diagram of an after treatment system for a lean-burn engine according to another aspect of the present disclosure. The after treatment system shown in FIG. 2 is a modification of the after treatment system shown in FIG. 1.

As shown in FIG. 2, the after treatment system according to another aspect of the present disclosure is equipped with the TWC 30, a particulate filter (Gasoline Particulate Filter; GPF) 70, the APC 40, the SCR catalyst 50, and the CUC 60 sequentially disposed on the exhaust pipe 20. Since the TWC 30, the APC 40, the SCR catalyst 50, and the CUC 60 are described above, detailed description thereof will be omitted.

The particulate filter 70 is mounted on the exhaust pipe 20 at a downstream of the TWC 30, traps the particulate matter contained in the exhaust gas, and burns the trapped particulate matter. The particulate filter 70 is provided with inlet cells and outlet cells alternately disposed in a housing, and a wall is disposed between the inlet cell and the outlet cell. The inlet cell has an end that is opened and the other end that is blocked, and the outlet cell has an end that is blocked and the other end that is opened. The exhaust gas flows into the particulate filter 70 through the opened end of the inlet cell, flows to the outlet cell through the wall, and flows out to an outside of the particulate filter 70 through the opened end of the outlet cell. When the exhaust gas passes through the wall, the particulate filter contained in the exhaust gas does not pass through the wall and remains in the inlet cell.

Figure 3:
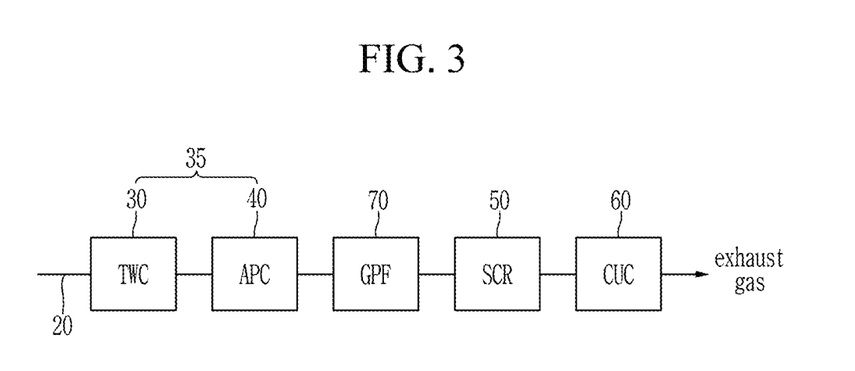
FIG. 3 is a schematic diagram of an after treatment system for a lean-burn engine according to other aspect of the present disclosure.

FIG. 3 is a schematic diagram of an after treatment system for a lean-burn engine according to other aspect of the present disclosure. The after treatment system shown in FIG. 3 is a modification of the after treatment system shown in FIG. 1.

As shown in FIG. 3, the after treatment system according to other aspect of the present disclosure is equipped with the TWC 30, the APC 40, the particulate filter 70, the SCR catalyst 50, and the CUC 60 sequentially disposed on the exhaust pipe 20. Since the TWC 30, the APC 40, the particulate filter 70, the SCR catalyst 50, and the CUC 60 are described above, detailed description thereof will be omitted.

FIG. 4 is a block diagram of an after treatment system for a lean-burn engine according to an aspect of the present disclosure.

FIG. 4 illustrates a simple example of inputs and outputs of the controller 90 to implement the after treatment system according to aspects of the present disclosure. It should be understood that the inputs and the outputs of the controller 90 according to aspects of the present disclosure are not limited to the example illustrated in FIG. 4.

As shown in FIG. 4, the controller 90 is electrically connected to the first, second, and third oxygen sensors 32, 34, and 36, the first and second temperature sensors 62 and a 64, and the air flowmeter 66, and receives the signals corresponding to the values detected by the sensors 32, 34, 36, 62, 64 and 66.

The first oxygen sensor 32 detects the concentration of the $O_2$ contained in the exhaust gas at the upstream of the TWC 30 and transmits the signal corresponding thereto to the controller 90. The second oxygen sensor 34 detects the concentration of the $O_2$ contained in the exhaust gas at the downstream of the TWC 30 and transmits the signal corresponding thereto to the controller 90. The controller 90 can determine whether the TWC 30 is operating normally based on the signals of the first and second oxygen sensors 32 and 34, and performs the AFR control of the engine 10.

In addition, the third oxygen sensor 36 detects the concentration of $O_2$ contained in the exhaust gas at the downstream of the ammonia production catalyst module 35 and transmits the signal corresponding thereto to the controller 90. The controller 90 determines whether the OSC of the ammonia production catalyst module 35 is completely consumed based on the signal of the third oxygen sensor 36. For example, if the signal of the third oxygen sensor 36 indicates that the AFR at the downstream of the ammonia production catalyst module 35 is rich, the controller 90 determines that the OSC of the ammonia production catalyst module 35 is completely consumed.

The first temperature sensor 62 detects the temperature of the exhaust gas at the upstream of the SCR catalyst 50 and transmits the signal corresponding thereto to the controller 90. The second temperature sensor 64 detects the temperature of the exhaust gas at the downstream of the SCR catalyst 50 and transmits the signal corresponding thereto to the controller 90. The controller 90 can calculate the temperatures of the TWC 30, the APC 40, the SCR catalyst 50, and the CUC 60 based on the signals of the first and second temperature sensors 62 and 64.

The air flowmeter 66 is mounted on an intake pipe or an intake duct to detect the amount of the air flowing into the intake system, and transmits the signal corresponding thereto to the controller 90.

The controller 90 controls operation of the engine 10 based on the values detected by the sensors 32, 34, 36, 62, 64 and 66. That is, the controller 90 can adjust the fuel injection amount to adjust the target AFR, and can delay the ignition timing for warming up the catalysts 30, 40, 50 and 60.

Hereinafter, referring to FIG. 5, an after treatment method according to an aspect of the present disclosure will be described in detail.

Figure 5:
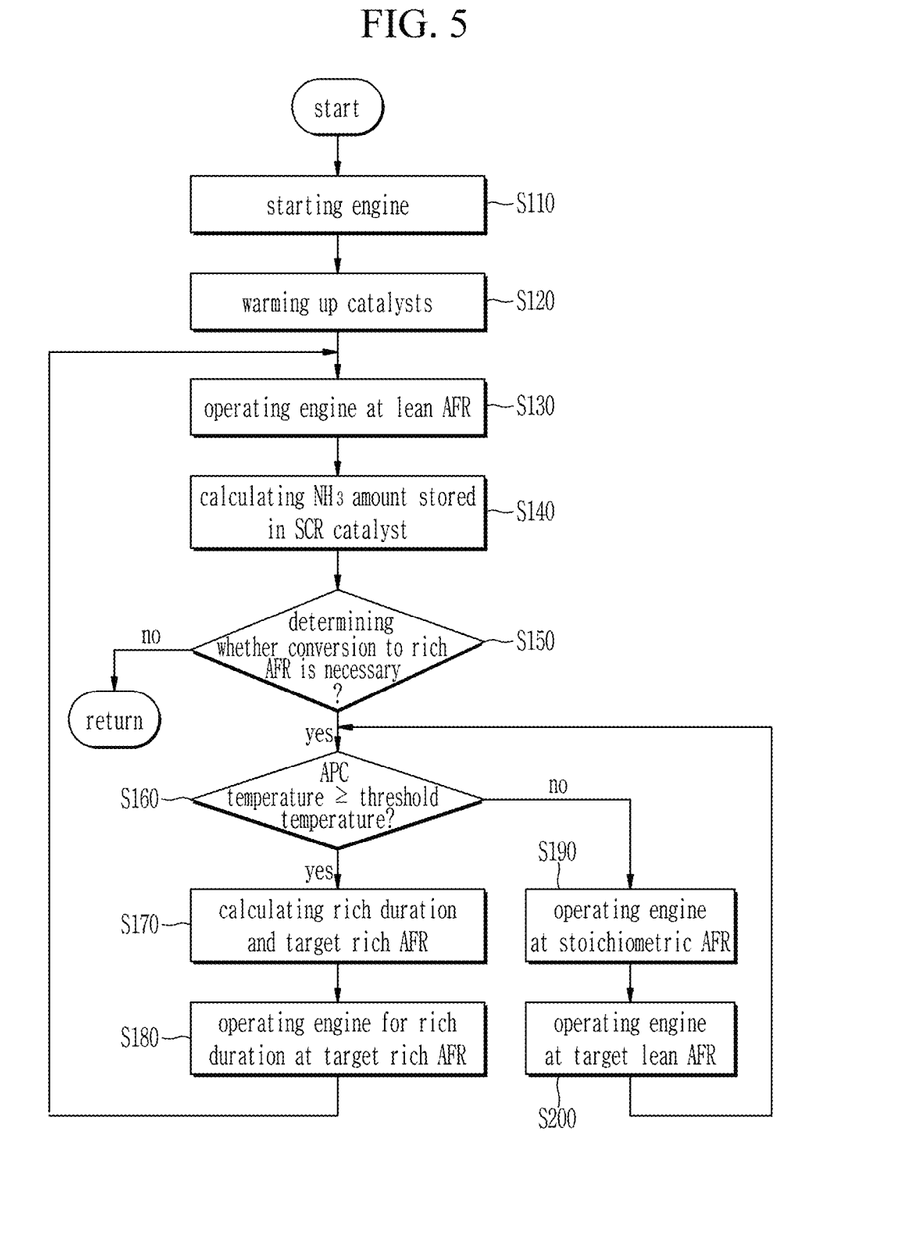
FIG. 5 is a flowchart of an after treatment method according to an aspect of the present disclosure.

FIG. 5 is a flowchart of an after treatment method according to an aspect of the present disclosure.

As shown in FIG. 5, when the engine 10 is started at step S110, the controller 90 calculates the temperatures of the catalysts 30, 40, 50 and 60. In order to carry out the after treatment method according to the aspect of the present disclosure, the catalysts 30, 40, 50 and 60 must be activated. Accordingly, the controller 90 warms up the catalysts 30, 40, 50 and 60 at step S120 if the catalysts 30, 40, 50 and 60 are not activated. That is, the ignition timing is delayed or the amount of the fuel injection is increased to increase the temperature of the exhaust gas.

When warming-up of the catalyst 30, 40, 50, and 60 is completed, the controller 90 operates the engine 10 at the lean AFR at step S130. Therefore, the TWC 30 purifies the CO and the HC contained in the exhaust gas and the particulate filter 70 collects the particulate matter contained in the exhaust gas. In addition, the APC 40 stores at least portion of the NOx contained in the exhaust gas.

The controller 90 calculates the amount of the $NH_3$ stored in the SCR catalyst 50 at step S140. That is, the amount of the $NH_3$ stored in the SCR catalyst 50 is calculated based on operation history of the engine 10, temperature history of the SCR catalyst 50, and the like.

After that, the controller 90 determines whether the rich AFR is desired or required, that is conversion to the rich AFR is desired based on the amount of the $NH_3$ stored in the SCR catalyst 50 at step S150.

In one aspect, in order to determine whether the conversion to the rich AFR is desired, the controller 90 calculates the amount of the NOx to be flowed into the SCR catalyst 50. The amount of the NOx generated in the engine 10 is calculated based on a combustion state (e.g., a combustion temperature, a combustion pressure, the air amount, the fuel amount, etc.) of the engine 10, and the amount of the NOx slipped from the ammonia production catalyst module 35 is calculated based on the AFR of the exhaust gas, the temperature of the TWC 30, the temperature of the APC 40, etc.

Thereafter, the controller 90 determines whether the SCR catalyst 50 can purify the NOx. That is, it is determined whether the amount of the $NH_3$ stored in the SCR catalyst 50 is sufficient to purify the NOx flowing into the SCR catalyst 50. For example, if the amount of the $NH_3$ stored in the SCR catalyst 50 is greater than or equal to an amount of the $NH_3$ required to purify the NOx to be flowed into the SCR catalyst 50, the controller 90 determines that the SCR catalyst 50 can purify the NOx. On the contrary, if the amount of the $NH_3$ stored in the SCR catalyst 50 is less than the amount of the $NH_3$ required to purify the NOx to be flowed into the SCR catalyst 50, the controller 90 determines that the conversion to the rich AFR is desired.

In another aspect, in order to determine whether the conversion to the rich AFR is desired, the controller 90 determines whether the amount of the $NH_3$ stored in the SCR catalyst 50 is greater than or equal to a lower threshold of the $NH_3$. For example, if the amount of the $NH_3$ stored in the SCR catalyst 50 is greater than or equal to the lower threshold of the $NH_3$, the controller 90 determines that the conversion to the rich AFR is not desired. On the contrary, if the amount of the $NH_3$ stored in the SCR catalyst 50 is less than the lower threshold of the $NH_3$, the controller 90 determines that the conversion to the rich AFR is desired.

If it is determined at the step S150 that the conversion to the rich AFR is desired, the controller 90 determines whether the temperature of the APC 40 is higher than or equal to a threshold temperature at step S160. For example, the controller 90 detects/calculates the temperature of the APC 40 based on the detected values of the first and second temperature sensors 62 and 64 and/or a detected value of an additional temperature sensor mounted on the exhaust pipe 20, and the detected/calculated temperature of the APC 40 is higher than or equal to the predetermined threshold temperature. In one aspect, the threshold temperature may be higher than or equal to 410° C. and is lower than or equal to 430° C. In another aspect, the threshold temperature may be 420° C.

If the temperature of the APC 40 is higher than or equal to the threshold temperature at the step S160, the controller 90 calculates a rich duration and a target rich AFR for generating the $NH_3$ at step S170. If a delay time has passed since the AFR was controlled to be rich, the CO begins to slip from the CUC 60. That is, the CUC 60 has ability to purify the CO slipped from the TWC 30 during the delay time and does not sufficiently purify the CO slipped from the TWC 30 after the delay time.

Therefore, if the number of times to enter the rich AFR is increased while reducing the rich duration where the rich AFR is maintained, the CO emission is reduced while the NOx contained in the exhaust gas is sufficiently purified. For example, if the rich duration in which the AFR is kept to be rich is set to 9 seconds and the number of times to enter the rich AFR is set to 11 times, the TWC 30 generates 0.78 g of the $NH_3$ for 99 seconds (9 seconds*11 times) and 0.78 g of the $NH_3$ can purify about 2.1 g of the NOx. In this case, the amount of the CO slipped from the CUC 60 is about 0.1 g. Therefore, it is desirable to increase the number of times to enter the rich AFR while reducing the rich duration to reduce the amount of the CO slipped from the CUC 60 while generating sufficient amount of the $NH_3$ in the TWC 30. Therefore, the rich duration is calculated such that a slip amount of the CO accumulated at a downstream of the CUC 60 is less than or equal to a predetermined value if the engine is operated at the target rich AFR for the rich duration. Alternatively, the rich duration may be a period to a time when the CO begins to slip from the CUC 60 when the engine 10 is operated at the target rich AFR. In addition, the target rich AFR can be set by a person of an ordinary skill in the art to improve the performance of the after treatment system while reducing fuel consumption. For example, the target rich AFR may be 0.97 that is slightly rich AFR, but is not limited thereto. Also, CO purification capacity of the CUC 60 varies with the temperature of the CUC 60. Therefore, the rich duration can be calculated according to the target rich AFR and the temperature of the CUC 60.

If the rich duration and the target rich AFR are calculated at the step S170, the controller 90 operates the engine 10 at the target rich AFR for the rich duration at step S180. That is, by driving the engine 10 at the target rich AFR for the rich duration, the TWC 30 and the APC 40 generates the $NH_3$ while reducing the amount of the CO slipped from the CUC 60.

After performing the step S180, the controller 90 returns to the step S130 and operates the engine 10 at the lean AFR. Even when the engine 10 is operated at the target rich AFR for the rich duration, the $NH_3$ generation may not be sufficient to purify the NOx that flows into the SCR catalyst 50 (e.g., the NOx amount that flows into the SCR catalyst 50 is greater than the amount of the NOx that can be purified by the $NH_3$ generation for the rich duration). Accordingly, the controller 90 operates the engine at the lean AFR for a predetermined time, and then performs the step S140 to the step S180 again. If the sufficient $NH_3$ is generated to purify the NOx flowing into the SCR catalyst 50, then the after treatment method will be terminated at the step S150.

In the meantime, if the temperature of the APC 40 is lower than the threshold temperature at the step S160, the controller 90 heats the APC 40 before entering the rich AFR. That is, the controller 90 operates the engine 10 at a stoichiometric AFR (i.e., $\lambda=1$) for a first predetermined duration at step S190.

Thereafter, the controller 90 operates the engine 10 at a target lean AFR for a second predetermined duration at step S200, and then returns to the step S160 to compare the temperature of the APC 40 with the threshold temperature. Here, the target lean AFR can be arbitrarily set to match intention of the design by a person of an ordinary skill in the art. In one aspect, the target lean AFR may be between 1.4 and 2.0 based on the detected value of the first oxygen sensor 32.

If the temperature of the APC 40 is higher than or equal to the threshold temperature at the step S160, the controller 90 sequentially performs the step S170 and the step S180.

(Test Method)

The TWC 30, the GPF 70, the APC 40, the SCR catalyst 50, and the CUC 60 are sequentially disposed on the exhaust pipe 20. After that, 2.0 L, 4-cylinders, lean-burn gasoline engine is connected to the exhaust pipe 20 and aging treatment is performed. The aging treatment is carried out at 1,000° C. on the TWC 30 basis for 50 hours.

The lean AFR ($\lambda$=1.8) is maintained for 5 minutes at an engine speed of 2,000 rpm to cause the entire after treatment system to be lean atmosphere, and the temperature of the APC 40 is maintained at 365° C. After that, the engine 10 is operated at the stoichiometric AFR for 12 seconds and is then operated again at the lean AFR ($\lambda$=1.8). At this time, the temperature of the TWC 30, the temperature of the APC 40, and concentration of the stored NOx slipped from the APC 40 are detected.

Figure 6:
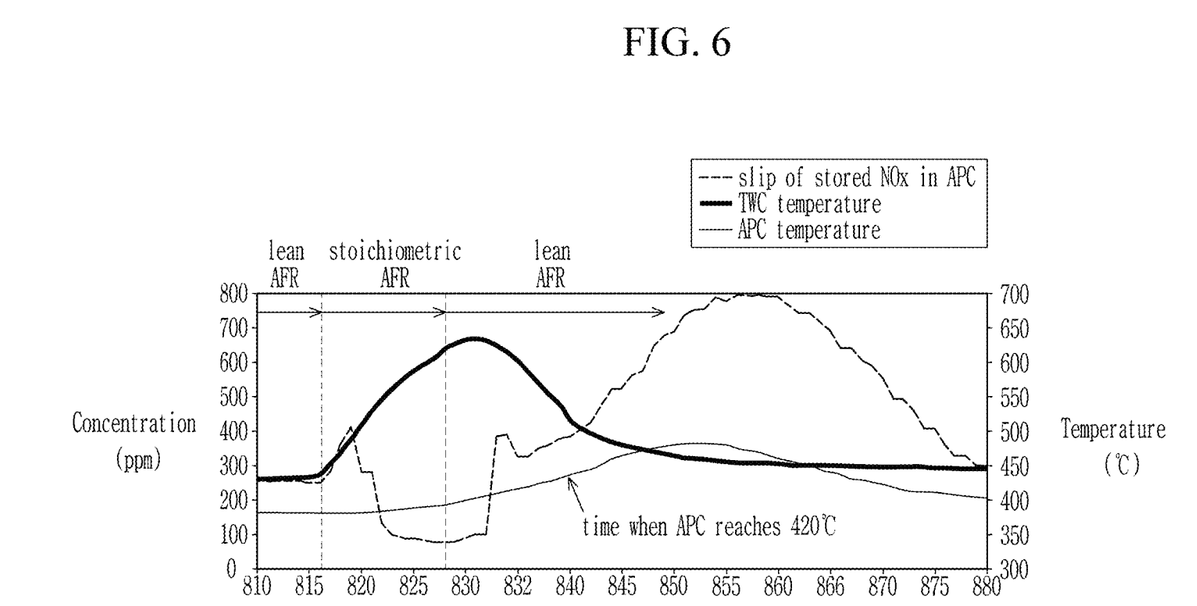
FIG. 6 is a graph showing a temperature of a TWC, a temperature of an APC, and concentration of a stored NOx slipped from the APC when the engine is operated sequentially at a lean AFR, a stoichiometric AFR, and a lean AFR.

FIG. 6 is a graph showing a temperature of a TWC, a temperature of an APC, and concentration of a stored NOx slipped from the APC when the engine is operated sequentially at a lean AFR, a stoichiometric AFR, and a lean AFR.

In FIG. 6, a thick solid line represents the temperature of the TWC 30, a thin solid line represents the temperature of the APC 40, and a dotted line represents the concentration of the stored NOx slipped from the APC 40.

If the engine 10 is operated at the stoichiometric AFR for 12 seconds, the temperature of the TWC 30 rises sharply and the temperature of the APC 40 rises slowly. Therefore, there is a time difference until the APC 40 is heated after the TWC 30 is heated. If the engine 10 is operated again at the lean AFR, the temperature of the TWC 30 rises to 700° C. and then falls sharply, and the temperature of the APC 40 gradually rises for about 20 seconds to about 30 seconds, and then slowly falls. When the temperature of the APC 40 reaches 420° C., the temperature of the TWC 30 is about 600° C. In conclusion, if the engine 10 is operated only at the stoichiometric AFR to heat the APC 40 to a target temperature, the temperature of the TWC 30 may rise excessively. As a result, the temperature of the SCR catalyst 50 also increases, and purification performance of the NOX may decrease. It can also be seen that even if the engine 10 is operated at the stoichiometric AFR for the first predetermined duration and then operated at the lean AFR, the APC 40 can be heated to the target temperature (e.g., threshold temperature).

Since the APC 40 stores the NOx contained in the exhaust gas at the lean AFR, if the engine 10 starts operating at the stoichiometric AFR, the amount of the stored NOx released from the APC 40 increases. Thereafter, since the amount of the NOx stored in the APC 40 is reduced, the amount of the stored NOx released from the APC 40 is also reduced. When the engine 10 is operated again at the lean AFR, the APC 40 stores the NOx contained in the exhaust gas again, thereby increasing the amount of the stored NOx released from the APC 40. Since the amount of the NOx stored by the APC 40 is also related to the temperature of the APC 40, the amount of the stored NOx released from the APC 40 increases as the temperature of the APC 40 rises.

On the other hand, if the engine 10 is operated at the stoichiometric AFR, the oxygen storage capacity (OSC) of the CUC 60 is consumed. If the engine 10 is operated at the rich AFR without recovery of the OSC of the CUC 60, the CO purifying capacity of the CUC 60 is rapidly deteriorated. The OSC of the CUC 60 is also related to the temperature of the CUC 60.

In conclusion, considering the temperature of the TWC 30, the temperature of the APC 40, the amount of the NOx stored in the APC 40, and the OSC of the CUC 60, the engine 10 can be operated for the second predetermined duration at the lean AFR after being operated for the first predetermined duration at the stoichiometric AFR, in order to heat the APC 40.

In one aspect, the first predetermined duration may be set to a value between 5 seconds and 15 seconds. In another aspect, the first predetermined duration may be set to 10 seconds. In other aspect, the first predetermined duration may be determined according to the temperature of the APC 40 at a time when it is determined that the conversion to the rich AFR is desired.

In one aspect, the second predetermined duration can be set to a value between 10 seconds and 30 seconds. In another aspect, the second predetermined duration may be set to a value between 10 seconds and 20 seconds. In other aspect, the second predetermined duration may be determined according to the first predetermined duration, the target lean AFR, and the temperature of the CUC 60.

Figure 7:
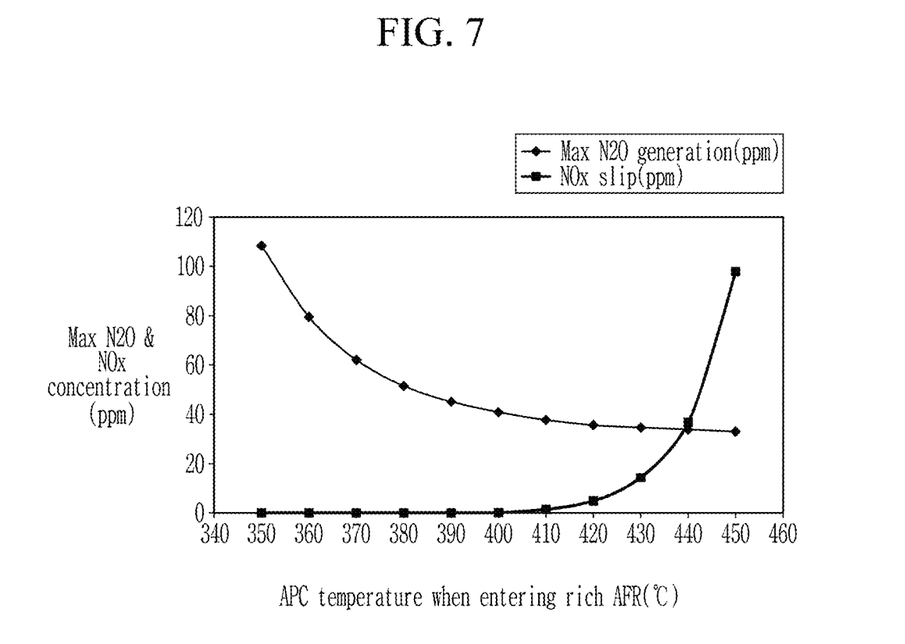
FIG. 7 is a graph showing concentration of a stored NOx slipped from an APC and maximum concentration of nitrous oxide generation according to a temperature of the APC when entering a rich AFR.

FIG. 7 is a graph showing concentration of a stored NOx slipped from an APC and increased or maximum concentration of nitrous oxide generation according to a temperature of the APC when entering a rich AFR. The graph in FIG. 7 is obtained by controlling the temperature of the APC 40 by controlling a time where the engine 10 is operated at the lean AFR at 1,500 rpm of the engine speed, and then operating the engine 10 at the rich AFR.

In FIG. 7, a thick solid line represents the concentration of the stored NOx slipped from the APC 40, and a thin solid line represents an increased, or the maximum, concentration of the nitrous oxide ($N_2O$) generation at the downstream of the APC 40.

As shown in FIG. 7, if the temperature of the APC 40 is below 400° C. when entering the rich AFR, the NOx stored in the APC 40 is not slipped. If the temperature of the APC 40 is higher than 400° C. when entering the rich AFR, the NOx stored in the APC 40 begins to slip. If the temperature of the APC 40 is higher than 430° C. when entering the rich AFR, the concentration of the stored NOx slipped from the APC 40 increases sharply.

In the meantime, if the temperature of the APC 40 is low when entering the rich AFR, the maximum concentration of the $N_2O$ generated in the APC 40 is very high. However, as the temperature of the APC 40 rises upon entering the rich AFR, the maximum concentration of the $N_2O$ generated in the APC 40 is drastically reduced. If the temperature of the APC 40 is higher than 400° C. when entering the rich AFR, the maximum concentration of the $N_2O$ generated in the APC 40 is less than 40 ppm.

In conclusion, to reduce the concentration of the stored NOx slipped from the APC 40 and to reduce the increased or maximum concentration of the $N_2O$ generated in the APC 40, the temperature of the APC 40 upon entering the rich AFR should be controlled to a value between 410° C. and 430° C. In one aspect, the threshold temperature of the APC 40 when entering the rich AFR may be greater than or equal to 410° C. and less than or equal to 430° C. In another aspect, the threshold temperature of the APC 40 when entering the rich AFR may be 420° C.

The performance of the after treatment method according to an aspect of the present disclosure will be compared with that of Comparative Example 1 and Comparative Example 2.

Aspect of the Disclosure

In the after treatment method according to the aspect of the present disclosure, the engine 10 is operated sequentially at the stoichiometric AFR and the lean AFR and is then operated at the rich AFR when the conversion to the rich AFR is desired. In further detail, the engine 10 is operated at the stoichiometric AFR for the first predetermined duration (e.g., 10 seconds) and then is operated at the target lean AFR (e.g., $\lambda=1.8$) for the second predetermined duration (e.g., 20 seconds) to heat the APC 40 to 420° C. Thereafter, the engine 10 is operated for the rich duration at the target rich AFR (e.g., $\lambda=0.97$).

Comparative Example 1

In the after treatment method according to Comparative Example 1, the AFR is directly converted into the rich AFR without going through the stoichiometric AFR and the lean AFR when the conversion to the rich AFR is desired. In further detail, the engine 10 is operated for the rich duration at the target rich AFR (e.g., $\lambda=0.97$) without heating the APC 40 (e.g., the temperature of the APC 40 is 365° C.).

Comparative Example 2

In the after treatment method according to Comparative Example 2, the engine 10 is operated at the stoichiometric AFR and then is operated at the rich AFR when the conversion to the rich AFR is desired. In further detail, the engine 10 is operated at the stoichiometric AFR to heat the APC 40 to 420° C., and then the engine 10 is operated for the rich duration at the target rich AFR (e.g., $\lambda=0.97$).

Figure 8:
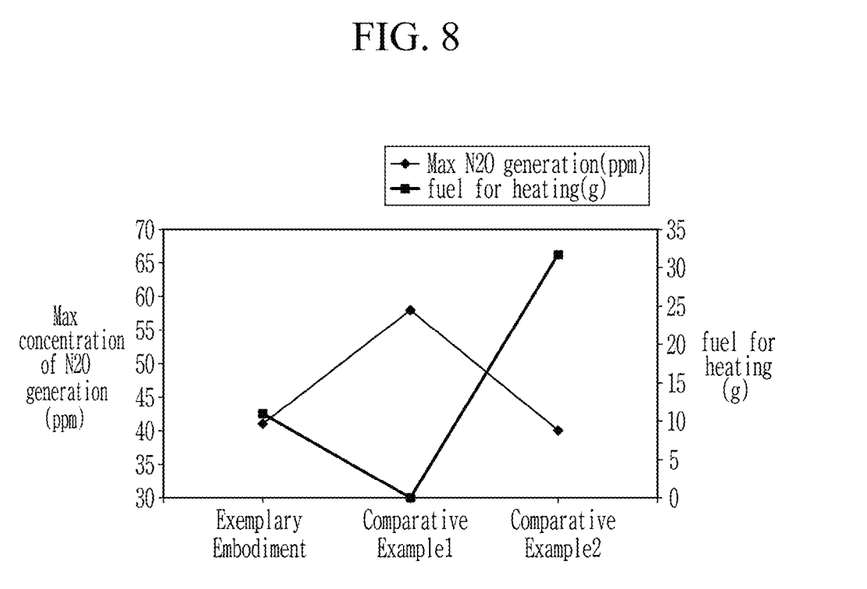
FIG. 8 is a graph showing a fuel amount used to heat an APC and maximum concentration of nitrous oxide generation when an engine enters a rich AFR without heating the APC, when the APC is heated by operating the engine only at a stoichiometric AFR, and when the APC is heated by operating the engine sequentially at the stoichiometric AFR and a lean AFR, respectively.

FIG. 8 is a graph showing a fuel amount used to heat an APC and maximum concentration of nitrous oxide generation when an engine enters a rich AFR without heating the APC, when the APC is heated by operating the engine only at a stoichiometric AFR, and when the APC is heated by operating the engine sequentially at the stoichiometric AFR and a lean AFR, respectively.

In FIG. 8, a thick solid line represents the amount of the fuel used for heating the APC 40, and a thin solid line represents the maximum concentration of the $N_2O$ generation at the downstream of the APC 40.

In Comparative Example 1, since the APC 40 is not heated, the fuel amount used for heating the APC 40 is zero. However, since the temperature of the APC 40 is low (e.g., 365° C.) when entering the rich AFR, the maximum concentration of the $N_2O$ generation in the APC 40 is very high. Thus, additional controls/catalytic converters are needed to reduce the $N_2O$ generated in the APC 40.

In Comparative Example 2, since the engine 10 is operated only at the stoichiometric AFR in order to heat the APC 40, the amount of the fuel used for heating the APC 40 is very large. For example, the amount of the fuel used for heating the APC 40 in Comparative Example 2 is more than twice the amount of the fuel used for heating the APC 40 in the aspect. In the meantime, since the temperature of the APC 40 when entering the rich AFR in Comparative Example 2 is equal to that of the APC 40 when entering the rich AFR in aspect, the maximum concentration of the $N_2O$ generated in the APC 40 in Comparative Example 2 is almost the same as that in the aspect.

In conclusion, to reduce the amount of the fuel used for heating the APC 40 and the $N_2O$ generated in the APC 40, the engine 10 can be operated at the rich AFR after being sequentially operated at the stoichiometric AFR and the target lean AFR.

Figure 9:
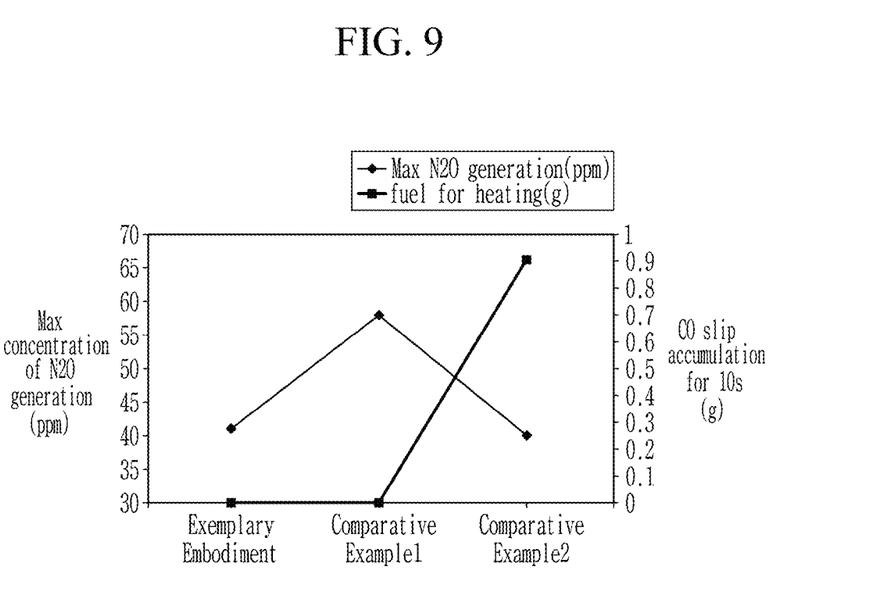
FIG. 9 is a graph showing an accumulated amount of CO slipped from a CUC for a predetermined duration at a rich AFR and maximum concentration of nitrous oxide generation when an engine enters the rich AFR without heating the APC, when the APC is heated by operating the engine only at a stoichiometric AFR, and when the APC is heated by operating the engine sequentially at the stoichiometric AFR and a lean AFR, respectively.

FIG. 9 is a graph showing an accumulated amount of CO slipped from a CUC for a predetermined duration at a rich AFR and increased or maximum concentration of nitrous oxide generation when an engine enters the rich AFR without heating the APC, when the APC is heated by operating the engine only at a stoichiometric AFR, and when the APC is heated by operating the engine sequentially at the stoichiometric AFR and a lean AFR, respectively.

In FIG. 9, a thick solid line represents the accumulated amount of the CO slipped from the CUC 60 when the engine 10 is operated for 10 seconds at the rich AFR, and a thin solid line represents the increased or maximum concentration of the $N_2O$ generation at the downstream of the APC 40.

In Comparative Example 1, since the engine 10 is not operated at the stoichiometric AFR, the OSC of the CUC 60 is not consumed. Therefore, the CO is not slipped from the CUC 60 when the engine 10 is operated for 10 seconds at the rich AFR.

In the aspect, the engine 10 is operated at the stoichiometric AFR and the OSC of the CUC 60 is consumed. However, the engine 10 is operated at the lean AFR before entering the rich AFR to recover the OSC of the CUC 60. Therefore, the CO is not slipped from the CUC 60 when the engine 10 is operated for 10 seconds at the rich AFR.

In Comparative Example 2, the engine 10 is operated at the stoichiometric AFR, consuming the OSC of the CUC 60, and then entering the rich AFR without recovery of the OSC of the CUC 60. Therefore, the CO is slipped from the CUC 60 when the engine 10 is operated for 10 seconds at the rich AFR. For example, 0.9 g of the CO is slipped from the CUC 60 for 10 seconds at the rich AFR. Therefore, if the rich duration is set so that the CO less than a predetermined value is slipped from the CUC 60, the rich duration is very short. However, if the rich duration is short, the amount of the $NH_3$ generated in the APC 40 is also very small. Additional controls/catalytic converters to reduce the CO slipped from the CUC 60 are needed to set the rich duration to generate sufficient NH3 in the APC 40.

In conclusion, the engine 10 can be operated at the rich AFR after being operated sequentially at the stoichiometric AFR and the target lean AFR to reduce the CO slipped from the CUC 60 and the $N_2O$ generated in the APC 40.

While this disclosure has been described in connection with what is presently considered to be practical aspects, it is to be understood that the disclosure is not limited to the disclosed aspects. On the contrary, it is intended to cover various modifications and equivalent arrangements included within the spirit and scope of the appended claims.

What is claimed is:

1. An after treatment system for a lean-burn engine, comprising:
    an exhaust pipe connected to the lean-burn engine and through which an exhaust gas generated in the lean-burn engine flows;
    a three-way catalyst (TWC) mounted on the exhaust pipe and purifying hydrocarbon (HC), carbon monoxide (CO), and nitrogen oxide (NOx) contained in the exhaust gas;
    an ammonia production catalyst (APC) mounted on the exhaust pipe downstream of the TWC, storing NOx at a lean air/fuel ratio (AFR), and generating H₂, releasing the stored NOx, and generating ammonia (NH₃) using the released NOx and the generated H₂ at a rich AFR;

a selective catalytic reduction (SCR) catalyst mounted on the exhaust pipe downstream of the APC, storing the NH₃ generated in the APC, and reducing the NOx contained in the exhaust gas using the stored NH₃;

a CO clean-up catalyst (CUC) mounted on the exhaust pipe downstream of the SCR catalyst and purifying the CO contained in the exhaust gas; and a controller detecting information on the AFR and temperature of the exhaust gas and controlling the AFR of the exhaust gas based on the information on the AFR and the temperature of the exhaust gas, wherein the controller compares a temperature of the APC with a threshold temperature in response to detecting conversion to the rich AFR is desired, and operates the engine at a stoichiometric AFR before converting in the rich AFR when the temperature of the APC is lower than the threshold temperature.

2. The after treatment system of claim 1, further comprising a particulate filter disposed between the TWC and the APC or between the APC and the SCR catalyst, wherein the particulate filter traps particulate matter in the exhaust gas.

3. The after treatment system of claim 1, wherein the controller operates the engine at the stoichiometric AFR for a first predetermined duration.

4. The after treatment system of claim 3, wherein the first predetermined duration is determined according to the temperature of the APC at a detecting time when the conversion to the rich AFR is desired.

5. The after treatment system of claim 3, wherein the controller operates the engine at a target lean AFR for a second predetermined duration before converting to the rich AFR after operating the engine at the stoichiometric AFR.

6. The after treatment system of claim 5, wherein the second predetermined duration is determined according to the first predetermined duration, the target lean AFR and a temperature of the CUC.

7. The after treatment system of claim 5, wherein the controller operates the engine at a target rich AFR for a rich duration after operating the engine at the target lean AFR for the second predetermined duration.

8. The after treatment system of claim 7, wherein the rich duration is determined according to the target rich AFR and the temperature of the CUC.

9. The after treatment system of claim 7, wherein the rich duration is calculated such that a slip amount of the CO accumulated downstream of the CUC for the rich duration is smaller than or equal to a predetermined value if the engine is operated at the target rich AFR for the rich duration.

10. An after treatment method for controlling an after treatment system sequentially equipped with a three-way catalyst (TWC), an ammonia production catalyst (APC), a selective catalytic reduction (SCR) catalyst, and a CO clean-up catalyst (CUC) on an exhaust pipe through which an exhaust gas flows and which is connected to a lean-burn engine, the after treatment method comprising:

operating the engine at a lean AFR;

calculating an amount of NH₃ stored in the SCR catalyst;

determining that conversion to a rich AFR is desired;

determining, in response to the conversion to the rich AFR being desired, whether a temperature of the APC is higher than or equal to a threshold temperature;

operating, in response to the temperature of the APC being lower than the threshold temperature, the engine at a stoichiometric AFR for a first predetermined duration; and operating the engine at a target rich AFR for a rich duration.

11. The after treatment method of claim 10, wherein the first predetermined duration is determined according to the temperature of the APC at a determining time when the conversion to the rich AFR is desired.

12. The after treatment system of claim 10, wherein the rich duration is determined according to the target rich AFR and a temperature of the CUC.

13. The after treatment system of claim 10, wherein the rich duration is calculated such that a slip amount of the CO accumulated downstream of the CUC for the rich duration is smaller than or equal to a predetermined value if the engine is operated at the target rich AFR for the rich duration.

14. The after treatment method of claim 10, wherein the determining that conversion to a rich AFR is desired includes calculating an amount of NOx which will flow into the SCR catalyst, and wherein the conversion to the rich AFR is determined to be desired when the amount of the NH₃ stored in the SCR catalyst is smaller than an amount of the NH₃ required to purify the amount of the NOx which will flow into the SCR catalyst.

15. The after treatment method of claim 10, wherein the determining that conversion to a rich AFR is desired includes comparing the amount of the NH₃ stored in the SCR catalyst with a predetermined NH₃ lower threshold, and wherein the conversion to the rich AFR is determined to be desired when the amount of the NH₃ stored in the SCR catalyst is smaller than the predetermined NH₃ lower threshold.

16. The after treatment method of claim 10, further comprising operating the engine at a target lean AFR for a second predetermined duration before operating the engine at the rich AFR for the rich duration after operating the engine at the stoichiometric AFR for the first predetermined duration.

17. The after treatment method of claim 16, wherein the second predetermined duration is determined according to the first predetermined duration, the target lean AFR and a temperature of the CUC.

* * * * *